United States Patent [19]

Shimizu et al.

[11] Patent Number: 5,349,474
[45] Date of Patent: Sep. 20, 1994

[54] REAR CONVERTER LENS

[75] Inventors: Seiji Shimizu; Masaru Takashima, both of Tokyo, Japan

[73] Assignee: Olympus Optical Co., Ltd., Tokyo, Japan

[21] Appl. No.: 3,428

[22] Filed: Jan. 12, 1993

[30] Foreign Application Priority Data

Jan. 13, 1992 [JP] Japan ................... 4-003958

[51] Int. Cl.$^5$ ............................................. G02B 15/08
[52] U.S. Cl. ................................. 359/675; 359/784
[58] Field of Search .......................... 359/675, 784

[56] References Cited

U.S. PATENT DOCUMENTS 4,206,971  6/1980  Hamanishi et al. ............... 359/675
4,643,536  2/1987  Yamada et al. .

FOREIGN PATENT DOCUMENTS 195817  11/1983  Japan .
 17114   1/1986  Japan .
160415   7/1987  Japan .
305316  12/1988  Japan .
 58489   9/1991  Japan .

Primary Examiner—Edward K. Look
Assistant Examiner—Christopher Verdier
Attorney, Agent, or Firm—Cushman, Darby & Cushman

[57] ABSTRACT

The invention is directed to a compact rear converter lens that has a high zoom ratio of the order of 1.7 to 2.0, is corrected in terms of various aberrations in a well-balanced manner, is little affected by production errors, and is made so compact that it can be built in a compact camera. This rear converter lens that has a negative focal length comprises three lenses or a first lens of negative power, a second lens of positive power and a third lens of negative power, conforms to $$0.3 < f_1/f_3 < 1 \quad (1)$$

$$0.23 < d_4/\Sigma d < 0.6 \quad (2)$$

where $f_1$ and $f_3$ are the focal lengths of the first and third lens, $d_4$ is the axial air space between the second and third lens, and $\Sigma d$ is the axial space from the first to sixth surface of the rear converter lens, and is attached on the image side of a master lens system ML.

8 Claims, 4 Drawing Sheets

ML

FIG. 3A
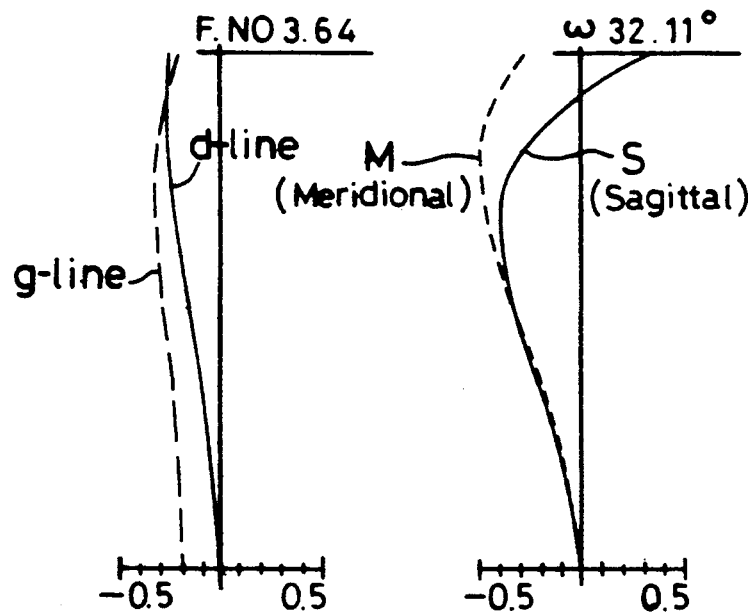
FIG. 3B
FIG. 3C
FIG. 4A
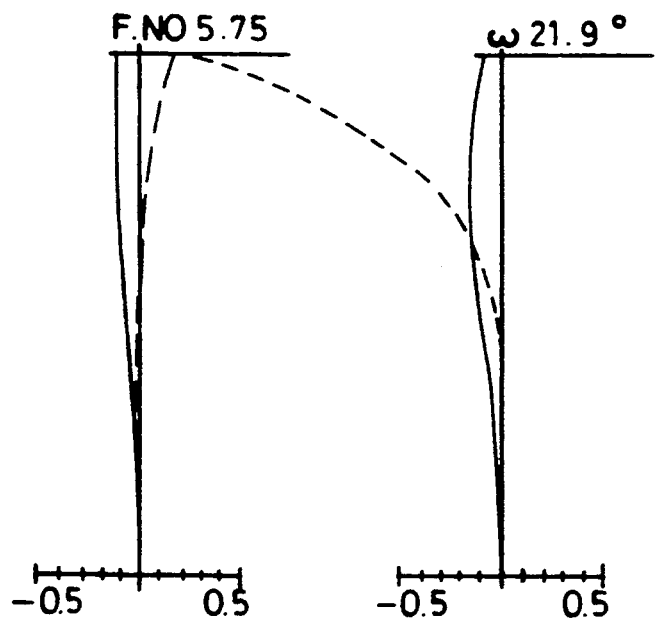
FIG. 4B
FIG. 4C

REAR CONVERTER LENS

BACKGROUND OF THE INVENTION

The present invention relates generally to a rear converter lens of the type that is attached on the image side of a master lens system to increase its focal length, and more particularly to a compact rear converter lens that has a large zoom ratio of about 1.7 to about 2.0 and is well suitable for use on a lens shutter camera.

So far, a typical rear converter lens that is designed to be attached on the image side of a master lens system to increase its focal length has been known from, for instance, JP-A-58-195817, 3-58489, 60-88916, 61-17114, 62-160415 or 63-305316.

Each of the rear converter lenses set forth in these specifications comprises three lenses or, in order from the object side, a first negative lens, a second positive lens and a third negative lens, as is the case with the rear converter lens of the invention. However, the rear converter lenses that are disclosed in JP-A-58-195817, 63-305316, 61-17114 and 60-88916 have a relatively small zoom ratio ranging from about 1.25 to about 1.63. The rear converter lens set forth in JP-A-62-160415 has a high zoom ratio, but involves difficulty in making up for various off-axial aberrations in ordinary photographic modes, because of being designed for use on the master lens system of a camera having a trimming mode. In the rear converter lens described in JP-A-3-58489, the third- and fifth-order coefficients of various aberrations (especially, spherical aberration and coma) that the fourth and fifth surfaces produce are so large that it can be greatly affected by production errors.

SUMMARY OF THE INVENTION

With such situations in mind, an object of the invention is to provide a rear converter lens that has a high zoom ratio of about 1.7 to about 2.0, is well corrected in terms of various aberrations, is made so compact that it can be built in a compact camera, and is reduced or limited in terms of the third- and fifth-order coefficients of aberrations the respective lens surfaces produce, so that it is hardly affected by production errors.

According to the invention, the object mentioned above is achieved by the provision of a rear converter lens designed to be attached on the image side of a master lens system to increase its focal length, which comprises a first lens of negative power, a second lens of positive power and a third lens of negative power, three in all; has a negative power as a whole; and, when attached on the image side of said master lens system, allows said first lens to be located proximately to said master lens system, and which conforms to the following conditions (1) and (2):

$$0.3 < f_1/f_3 < 1 \quad (1)$$

$$0.23 < d_4/\Sigma d < 0.6 \quad (2)$$

where $f_1$ and $f_3$ are the focal lengths of the first and third lenses, respectively, $d_4$ is the axial air space between the second and third lens, and $\Sigma d$ is the axial space from the first to sixth surface of the rear converter lens.

In the invention, it is further desired that the following condition (3), (4), (5) or (6) be satisfied:

$$0.9 < |f_1/f_2| < 1.7 \quad (3)$$

$$0.3 < |f_2/f_3| < 0.7 \quad (4)$$

$$0.3 < |r_1/F'| < 1.5 \quad (5)$$

$$0.2 < |r_6/F'| < 0.7 \quad (6)$$

where $f_2$ is the focal length of the second lens, $r_1$ and $r_6$ are the radii of curvature of the first and sixth lens surfaces, respectively, as viewed in order from the object side of the rear converter lens, and $F'$ is the focal length of the overall rear converter lens system.

The present invention provides another rear converter lens again designed to be attached on the image side of a master lens system to increase its focal length, which comprises a first lens of negative power, a second lens of positive power and a third lens of negative power; has a negative power as a whole; and when attached on the image side of said master lens system, allows the first lens to be located proximately to said master lens, and which further conforms to the following conditions (1), (2), (3) and (4):

$$0.3 < f_1/f_3 < 1 \quad (1)$$

$$0.23 < d_4/\Sigma d < 0.6 \quad (2)$$

$$0.9 < |f_1/f_2| < 1.7 \quad (3)$$

$$0.3 < |f_2/f_3| < 0.7 \quad (4)$$

where $f_1$, $f_2$ and $f_3$ are the focal lengths of the first, second and third lenses, respectively, $d_4$ is the axial air space between the second lens and third lens, and $\Sigma d$ is the axial space from the first surface to the sixth surface of the rear converter lens.

The present invention provides a further rear converter lens again designed to be attached on the image side of a master lens system to increase its focal length, which comprises a first lens of negative power, a second lens of positive power and a third lens of negative power; has a negative power as a whole; and when attached on the image side of said master lens system, allows the first lens to be located proximately to said master lens, and which further conforms to the following conditions (1), (2), (3), (4), (5) and (6):

$$0.3 < f_1/f_3 < 1 \quad (1)$$

$$0.23 < d_4/\Sigma d < 0.6 \quad (2)$$

$$0.9 < |f_1/f_2| < 1.7 \quad (3)$$

$$0.3 < |f_2/f_3| < 0.7 \quad (4)$$

$$0.3 < |r_1/F'| < 1.5 \quad (5)$$

$$0.2 < |r_6/F'| < 0.7 \quad (6)$$

where $f_1$, $f_2$ and $f_3$ are the focal lengths of the first, second and third lenses, respectively, $d_4$ is the axial air space between the second lens and third lens, $\Sigma d$ is the axial space from the first surface to the sixth surface of the rear converter lens, $r_1$ and $r_6$ are the radii of curvature of the first and sixth lens surfaces, respectively, as viewed in order from the object side of the rear converter lens, and $F'$ is the focal length of the overall rear converter lens system.

In what follows, reference will be made to why the constructions mentioned above are adopted and how they act.

In order to achieve a high zoom ratio of the order of 1.7 to 2.0, as intended in the invention, it is required to construct a rear converter lens with a relatively strong negative power. In the invention, however, this is achieved by using two negative lenses, because the individual powers thereof can be reduced or limited. This can in turn prevent an excessive reduction in the Petzval's sum and so can make up for various aberrations in a well-balanced manner.

Conditional Formula (1) concerns the power ratio of the first and third lenses. Below the lower limit of Formula (1) some large, outward coma occurs from the intermediate to peripheral regions of the image plane, and this is hardly corrected. Above the upper limit of Formula (1), on the other hand, difficulty is involved in correction of the curvature of field.

Conditional Formula (2) relates to the ratio of the axial air space between the second and third lenses with respect to the overall length of the rear converter lens. If that ratio lies in the range defined by Formula (2), it is then possible to reduce or limit the third- and fifth-order coefficients of various aberrations (especially, spherical aberration and coma) the respective surfaces, inter alia, fourth and fifth surfaces of the rear converter lens produce, thus making the rear converter lens most unlikely to be affected by production errors.

The goal of the invention is achievable by satisfying the conditions mentioned above. More preferably, however, the rear converter lens of the invention should conform to the following conditions (3), (4), (5) and (6):

$$0.9 < |f_1/f_2| < 1.7 \quad (3)$$

$$0.3 < |f_2/f_3| < 0.7 \quad (4)$$

$$0.3 < |r_1/F'| < 1.5 \quad (5)$$

$$0.2 < |r_6/F'| < 0.7 \quad (6)$$

where $f_2$ is the focal length of the second lens, $r_i$ is the radius of curvature of the i-th lens surface, as viewed in order from the object side, and $F'$ is the focal length of the overall rear converter lens system.

Conditional Formulae (3) and (4) relate to the power ratios of the first to second lens and the second to third lens, respectively. In other words, Formulae (3) and (4) provide the condition that, when the negative power is distributed to two negative lenses according to Formula (1), this makes it possible to maintain the power of the positive lens located between them at a suitable value, thereby achieving a high zoom ratio and to prevent an excessive reduction in the Petzval's sum, thereby compensating for various aberrations in a well-balanced manner.

Below the lower limit of Formula (3) difficulty is involved in correction of spherical aberration and astigmatism, whereas above the upper limit of Formula (3) it is difficult to make up for coma that occurs from the intermediate to peripheral regions of the image plane.

Below the lower limit of Formula (4) difficulty comes across in correction of spherical aberration and astigmatism, whereas above the upper limit of Formula (4) it is difficult to correct astigmatism and coma that occurs from the intermediate to peripheral regions of the image plane.

Conditional Formula (5) concerns the power of the object-side lens surface of the first lens. If that power is maintained in this range, it is then possible to achieve well-balanced correction of astigmatism and coma that occurs from the intermediate to peripheral regions of the image plane.

Conditional Formula (6) is directed to the power of image-side lens surface of the third lens. If that power is kept in this range, it is then possible to achieve well-balanced correction of spherical aberration and coma that occurs from the intermediate to peripheral regions of the image plane.

Still other objects and advantages of the invention will in part be obvious and will in part be apparent from the specification.

The invention accordingly comprises the features of the construction, combinations of elements, and arrangement of parts which will be exemplified in the construction hereinafter set forth, and the scope of the invention will be indicated in the claims.

BRIEF DESCRIPTION OF THE DRAWINGS

The invention will now be explained, by way of example but not by way of limitation, with reference to the accompanying drawings, in which:

FIG. 3 is an aberration diagram showing the spherical aberration, astigmatism and distortion of the master lens system shown in FIG. 1, FIG. 4 is an aberration diagram similar to FIG. 3, when Example 1 of the rear converter lens is attached on the master lens system shown in FIG. 1.

DESCRIPTION OF THE PREFERRED EMBODIMENTS

In the ensuing description, Examples 1-5 of the rear converter lens of the invention will be explained with reference to FIGS. 1-8.

Figure 1:
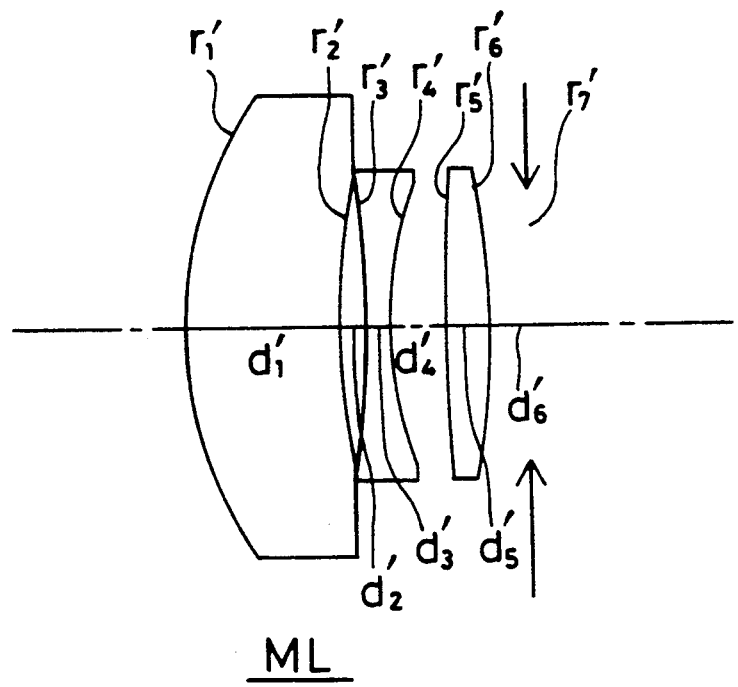
FIG. 1 is a sectional view of one example of the master lens system on which the rear converter lens of the invention is attached.

One example of a master lens system ML, on which the rear converter lens of the invention is attached, is a triplet type lens, the section of which is shown in FIG. 1 and the data of which will be given later.

Figure 2:
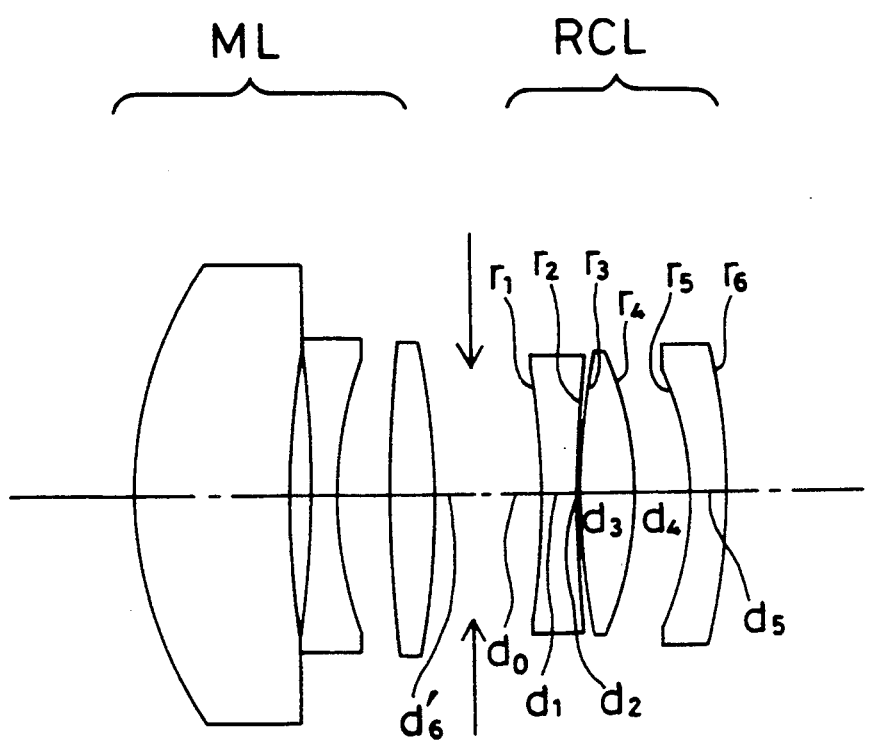
FIG. 2 is a sectional view of Example 1 of the rear converter lens of the invention that is attached on the master lens system shown in FIG. 1.
Figure 5A:
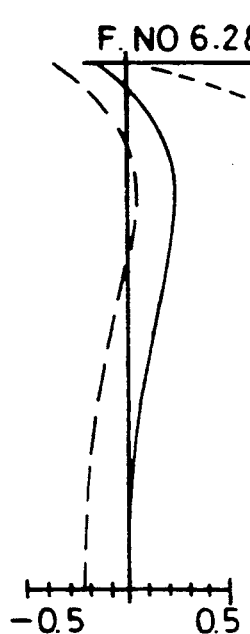
FIG. 5 is an aberration diagram of Example 2 that is similar to FIG. 4.
Figure 5B:
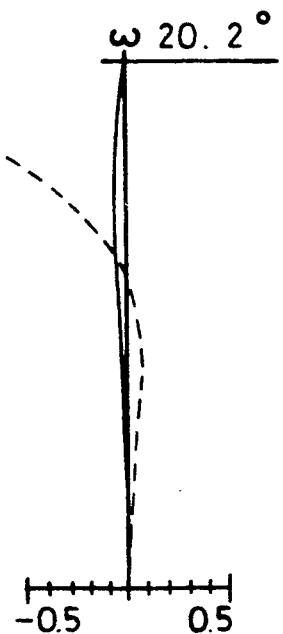
Figure 5C:
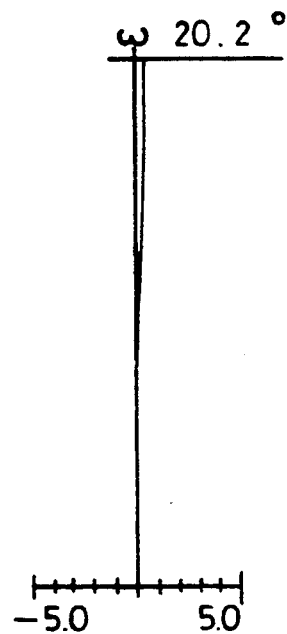
Figure 6A:
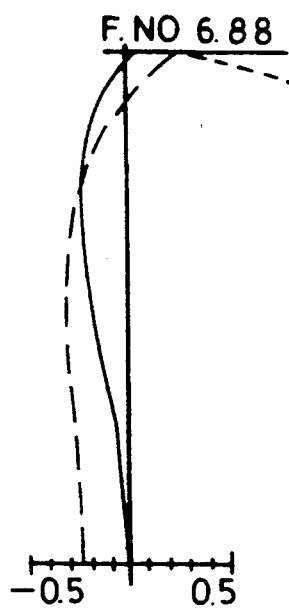
FIG. 6 is an aberration diagram of Example 3 that is similar to FIG. 4.
Figure 6B:
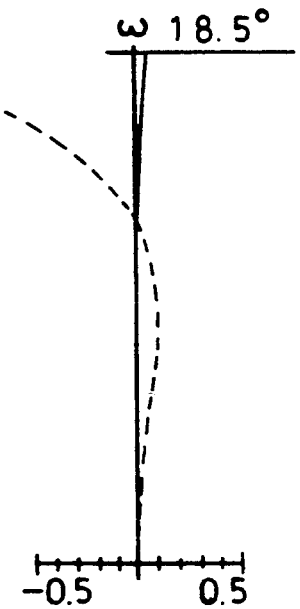
Figure 6C:
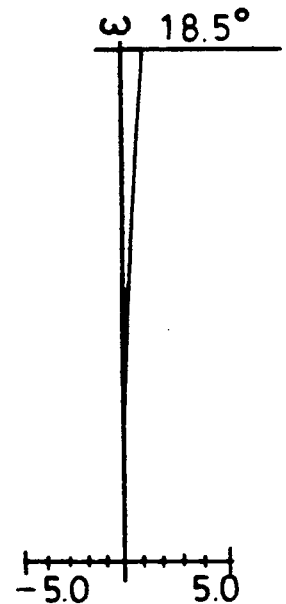
Figure 7A:
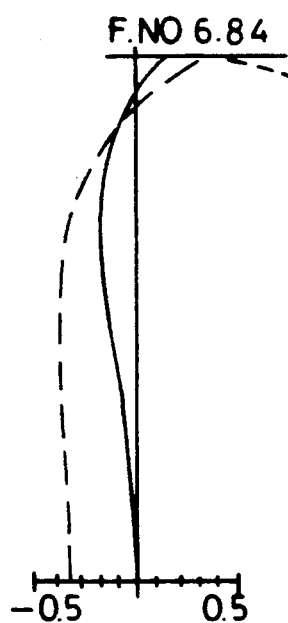
FIG. 7 is an aberration diagram of Example 4 that is similar to FIG. 4.
Figure 7B:
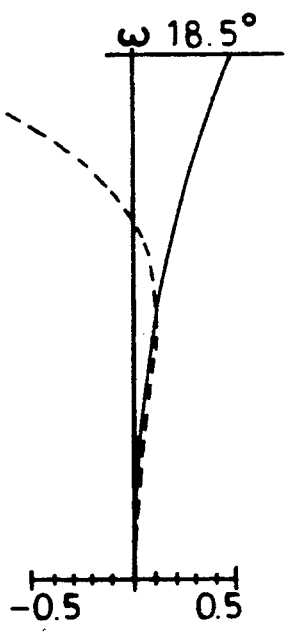
Figure 7C:
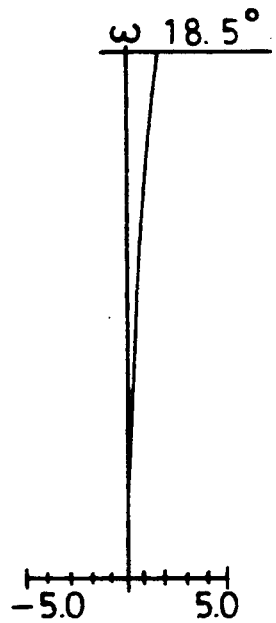
Figure 8A:
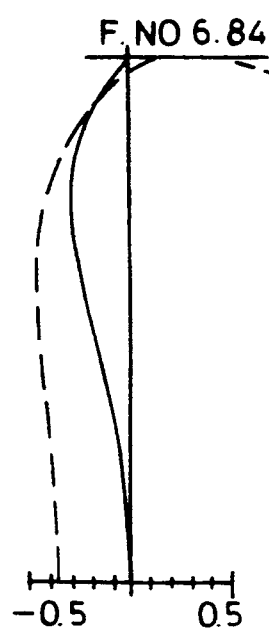
FIG. 8 is an aberration diagram of Example 5 that is similar to FIG. 4.
Figure 8B:
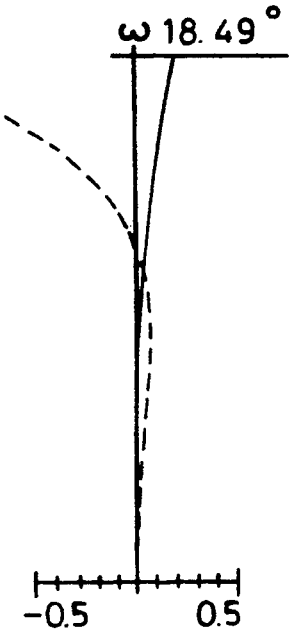
Figure 8C:
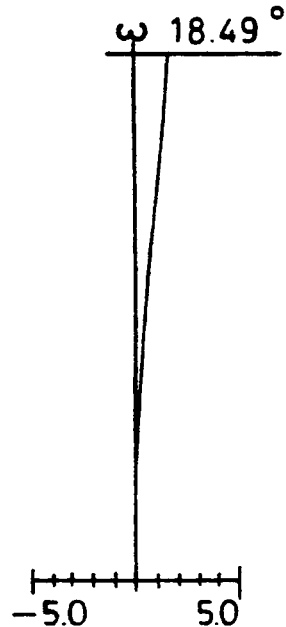

As shown in FIG. 2, a rear converter lens RCL of the invention is attached on the image side of such a master lens system ML. Example 1 is the rear converter lens RCL shown in FIG. 2. Unexceptionally, the rear converter lenses of the invention each comprise a double-concave lens, a double-convex lens and a negative meniscus lens convex to the image side. Thus, Examples 2-5 are not illustrated.

Set out below are the lens data of the master lens system and Examples 1-5 of the rear converter lens of the invention. It is noted that symbols hereinafter used but not hereinbefore mean:

F is the focal length of the master lens system or the focal length of the overall system in which the rear converter lens is attached on the master lens system, $F_{NO}$ is the F-number of the master lens system or the F-number of the overall system in which the rear converter lens is attached on the master lens system, $2\omega$ is the field angle of the master lens system or the field angle of the overall system in which the rear converter lens is attached on the master lens system, $r_1, r_2, \ldots$ are the radii of curvature of the respective lens surfaces, $d_1, d_2, \ldots$ are the spaces between the respective lens surfaces, $n_{d1}, n_{d2}, \ldots$ are the d-line refractive indices of the respective lenses, $\nu_{d1}, \nu_{d2}, \ldots$ are the Abbe's numbers of the respective lenses, and $d_0$ is the space between the location of a stop in the master lens system and the first surface of the rear converter lens.

It is also noted that the radii of curvature, d-line refractive indices and Abbe's numbers of the respective lens surfaces of the master lens system and the spaces between them are denoted by $r_i'$, $d_i'$, $n_{di}'$ and $\nu_{di}'$, respectively.

| Master lens system | | | |
|---|---|---|---|
| F = 33.9 | | | |
| $F_{NO}$ = 1:3.6 | | | |
| $2\omega$ = 64.22° | | | |
| $r_1'$ = 10.6000 | $d_1'$ = 4.610 | $\eta_{d1}'$ = 1.73400 | $\nu_{d1}'$ = 51.49 |
| $r_2'$ = 27.7050 | $d_2'$ = 0.590 | | |
| $r_3'$ = −35.2920 | $d_3'$ = 0.800 | $\eta_{d2}'$ = 1.68893 | $\nu_{d2}'$ = 31.08 |
| $r_4'$ = 11.2770 | $d_4'$ = 1.540 | | |
| $r_5'$ = 41.7410 | $d_5'$ = 1.300 | $\eta_{d3}'$ = 1.79952 | $\nu_{d3}'$ = 42.24 |
| $r_6'$ = −21.7810 | $d_6'$ = 1.090 | | |
| $r_7'$ = ∞(Stop) | | | |

Example 1

| F = 53.5 | | | |
|---|---|---|---|
| $F_{NO}$ = 1:5.7 | | | |
| $2\omega$ = 43.8° | | | |
| | $d_0'$ = 2.000 | | |
| $r_1'$ = −26.2238 | $d_1'$ = 0.900 | $\eta_{d1}'$ = 1.85026 | $\nu_{d1}'$ = 32.38 |
| $r_2'$ = 27.4671 | $d_2'$ = 0.100 | | |
| $r_3'$ = 17.7483 | $d_3'$ = 1.627 | $\eta_{d2}'$ = 1.59270 | $\nu_{d2}'$ = 35.29 |
| $r_4'$ = −10.1703 | $d_4'$ = 1.654 | | |
| $r_5'$ = −8.5073 | $d_5'$ = 0.954 | $\eta_{d3}'$ = 1.81554 | $\nu_{d3}'$ = 44.36 |
| $r_6'$ = −17.6248 | | | |
| $f_1/f_3$ = 0.74 | | | |
| $d_4/\Sigma d$ = 0.316 | | | |

Example 2

| F = 64.1 | | | |
|---|---|---|---|
| $F_{NO}$ = 1:6.8 | | | |
| $2\omega$ = 37.0° | | | |
| | $d_0'$ = 2.000 | | |
| $r_1'$ = −26.1370 | $d_1'$ = 0.663 | $\eta_{d1}'$ = 1.85026 | $\nu_{d1}'$ = 32.28 |
| $r_2'$ = 26.6926 | $d_2'$ = 0.100 | | |
| $r_3'$ = 15.4156 | $d_3'$ = 2.460 | $\eta_{d2}'$ = 1.59270 | $\nu_{d2}'$ = 35.29 |
| $r_4'$ = −8.9744 | $d_4'$ = 1.422 | | |
| $r_5'$ = −7.3880 | $d_5'$ = 1.043 | $\eta_{d3}'$ = 1.81600 | $\nu_{d3}'$ = 46.62 |
| $r_6'$ = −18.2084 | | | |
| $f_1/f_3$ = 0.97 | | | |
| $d_4/\Sigma d$ = 0.250 | | | |

Example 3

| F = 64.1 | | | |
|---|---|---|---|
| $F_{NO}$ = 1:6.8 | | | |
| $2\omega$ = 37.0° | | | |
| | $d_0'$ = 2.000 | | |
| $r_1'$ = −34.7685 | $d_1'$ = 0.800 | $\eta_{d1}'$ = 1.87400 | $\nu_{d1}'$ = 35.26 |
| $r_2'$ = 15.8527 | $d_2'$ = 0.150 | | |
| $r_3'$ = 12.5597 | $d_3'$ = 1.746 | $\eta_{d2}'$ = 1.59270 | $\nu_{d2}'$ = 35.29 |
| $r_4'$ = −11.9108 | $d_4'$ = 2.472 | | |
| $r_5'$ = −8.8178 | $d_5'$ = 0.719 | $\eta_{d3}'$ = 1.78800 | $\nu_{d3}'$ = 47.38 |
| $r_6'$ = −17.0688 | | | |
| $f_1/f_3$ = 0.51 | | | |
| $d_4/\Sigma d$ = 0.42 | | | |

Example 4

| F = 63.7 | | | |
|---|---|---|---|
| $F_{NO}$ = 1:6.8 | | | |
| $2\omega$ = 37.0° | | | |
| | $d_0'$ = 2.000 | | |
| $r_1'$ = −40.7487 | $d_1'$ = 0.800 | $\eta_{d1}'$ = 1.80100 | $\nu_{d1}'$ = 34.97 |
| $r_2'$ = 14.7660 | $d_2'$ = 0.200 | | |
| $r_3'$ = 12.5256 | $d_3'$ = 2.061 | $\eta_{d2}'$ = 1.59270 | $\nu_{d2}'$ = 35.29 |
| $r_4'$ = −12.5256 | $d_4'$ = 2.405 | | |
| $r_5'$ = −9.3500 | $d_5'$ = 0.804 | $\eta_{d3}'$ = 1.77250 | $\nu_{d3}'$ = 49.66 |
| $r_6'$ = −22.2641 | | | |
| $f_1/f_3$ = 0.63 | | | |
| $d_4/\Sigma d$ = 0.383 | | | |

Example 5

| F = 63.7 | | | |
|---|---|---|---|
| $F_{NO}$ = 1:6.8 | | | |
| $2\omega$ = 37.0° | | | |
| | $d_0'$ = 2.000 | | |
| $r_1'$ = −59.9726 | $d_1'$ = 0.800 | $\eta_{d1}'$ = 1.85026 | $\nu_{d1}'$ = 32.28 |
| $r_2'$ = 16.4770 | $d_2'$ = 0.231 | | |
| $r_3'$ = 13.3183 | $d_3'$ = 2.538 | $\eta_{d2}'$ = 1.58362 | $\nu_{d2}'$ = 30.37 |
| $r_4'$ = −13.3183 | $d_4'$ = 2.397 | | |
| $r_5'$ = −9.9474 | $d_5'$ = 0.838 | $\eta_{d3}'$ = 1.83400 | $\nu_{d3}'$ = 37.16 |
| $r_6'$ = −24.2658 | | | |
| $f_1/f_3$ = 0.73 | | | |
| $d_4/\Sigma d$ = 0.352 | | | |

FIGS. 3–8 show aberration diagrams showing spherical aberrations, astigmatisms and distortions when an object at infinity is focused with Examples 1–5 of the rear converter lenses attached on the master lens system.

As can be seen from the foregoing, the rear converter lens of the invention has a high zoom ratio of the order of 1.7 to 2.0, is corrected in terms of various aberrations in a well-balanced manner, is little affected by production errors, and is made so compact that it can be built in a compact camera.

What we claim is:

1. A rear converter lens adapted to be attached on the image side of a master lens system to increase its focal length, the rear converter lens consisting of a first lens of negative power, a second lens of positive power and a third lens of negative power;

wherein said rear converter lens has a negative power as a whole; and when attached on the image side of said master lens system, allows said first lens to be disposed proximately to said master lens system, and said rear converter lens conforms to the following conditions:

$0.3 < f_1/f_3 < 1$ $0.23 < d_4/\Sigma d < 0.6$ where $f_1$, and $f_3$ are the focal lengths of the first and third lenses, respectively, $d_4$ is the axial air space between the second and third lens, and $\Sigma d$ is the axial space from the first to sixth surface of the rear converter lens.

2. A rear converter lens as claimed in claim 1, which conforms to the following condition:

$0.3 < |r_1/F| < 1.5$ where $r_1$ is the radius of curvature of the first lens surface, as viewed in order from the object side of said rear converter lens, and F' is the focal length of the overall rear converter lens system.

3. A rear converter lens as claimed in claim 1, which conforms to the following condition:

$0.2 < |r_6/F'| < 0.7$ where $r_6$ is the radius of curvature of the sixth lens surface, as viewed in order from the object side of said rear converter lens, and F' is the focal length of the overall rear converter lens system.

4. A rear converter lens adapted to be attached on the image side of a master lens system to increase its focal length, the rear converter lens comprising a first lens of negative power, a second lens of positive power and a third lens of negative power;

wherein said rear converter lens has a negative power as a whole; and when attached on the image side of said master lens system, allows said first lens to be disposed proximately to said master lens system; and said rear converter lens conforms to the following conditions:

$0.3 < f_1/f_3 < 1$ $0.23 < d_4/\Sigma d < 0.6$ $0.9 < |f_1/f_2| < 1.7$ where $f_1$, $f_2$ and $f_3$ are the focal lengths of the first, second and third lenses, respectively, $d_4$ is the axial air space between the second and third lens, and $\Sigma d$ is the axial space from the first to sixth surface of the rear converter lens.

5. A rear converter lens adapted to be attached on the image side of a master lens system to increase its focal length, the rear converter lens comprising a first lens of negative power, a second lens of positive power and a third lens of negative power;

wherein said rear converter lens has a negative power as a whole; and when attached on the image side of said master lens system, allows said first lens to be disposed proximately to said master lens system; and said rear converter lens conforms to the following conditions:

$0.3 < f_1/f_3 < 1$ $0.23 < d_4/\Sigma d < 0.6$ $0.3 < |f_2/f_3| < 0.7$ where $f_1$, $f_2$ and $f_3$ are the focal lengths of the first, second and third lenses, respectively, $d_4$ is the axial air space between the second and third lens, and $\Sigma d$ is the axial space from the first to sixth surface of the rear converter lens.

6. A rear converter lens adapted to be attached on the image side of a master lens system to increase its focal length, the rear converter lens consisting of a first lens of negative power, a second lens of positive power and a third lens of negative power wherein said rear converter lens has a negative power as a whole; and when attached on the image side of said master lens system, allows said first lens to be proximately to said master lens system, and said rear converter lens conforms to the following conditions:

$0.3 < f_1/f_3 < 1$ $0.23 < d_4/\Sigma d < 0.6$ $0.9 < |f_1/f_2| < 1.7$ $0.3 < |f_2/f_3| < 0.7$ where $f_1$, $f_2$ and $f_3$ are the focal lengths of the first, second and third lenses, respectively, $d_4$ is the axial air space between the second and third lens, and $\Sigma d$ is the axial space from the first to sixth surface of the rear converter lens.

7. A rear converter lens adapted to be attached on the image side of a master lens system to increase its focal length, the rear converter lens consisting of a first lens of negative power, a second lens of positive power and a third lens of negative power wherein said rear converter lens has a negative power as a whole; and when attached on the image side of said master lens system, allows said first lens to be proximately to said master lens system, and said rear converter lens conforms to the following conditions:

$0.3 < f_1/f_3 < 1$ $0.23 < d_4/\Sigma d < 0.6$ $0.9 < |f_1/f_2| < 1.7$ $0.3 < |f_2/f_3| < 0.7$ $0.3 < |r_1/F'| < 1.5$ $0.2 < |r_6/F'| < 0.7$ where $f_1$, $f_2$ and $f_3$ are the focal lengths of the first, second and third lenses, respectively, $d_4$ is the axial air space between the second and third lens, and $\Sigma d$ is the axial space from the first to sixth surface of the rear converter lens, $r_1$, and $r_6$ are the radii of curvature of the first and sixth lens surfaces, respectively, as viewed in order form the object side of the rear converter lens, and F' is the focal length of the overall rear converter lens system.

8. A rear converter lens designed to be attached on the image side of a master lens system to increase its focal length, the rear converter lens consisting of, in order from the side of the master lens system, a first lens of negative power, a second lens of positive power and a third lens of negative power; wherein said rear converter lens has a negative power as a whole; and when attached on the image side of said master lens system, allows said first lens to be located proximately to said master lens system, and said rear converter lens conforms to the following conditions:

$0.3 < f_1/f_3 < 1$ $0.23 < d_4/\Sigma d < 0.6$ where $f_1$, and $f_3$ are the focal lengths of the first and third lenses, respectively, $d_4$ is the axial air space between the second and third lens, and $\Sigma d$ is the axial space from the first to sixth surface of the rear converter lens.

* * * * *